United States Patent [19]

Bolgiano

[11] 4,006,316
[45] Feb. 1, 1977

[54] CODE-CONTROLLED DETECTION AND FUNCTION ACTUATING SYSTEM

[75] Inventor: Duane Ridgely Bolgiano, Bala Cynwyd, Pa.

[73] Assignee: International Mobile Machines Corporation, Philadelphia, Pa.

[22] Filed: Oct. 28, 1975

[21] Appl. No.: 626,021

Related U.S. Application Data

[63] Continuation-in-part of Ser. No. 496,450, Aug. 12, 1974, Pat. No. 3,936,617.

[52] U.S. Cl. .............................. 179/84 R; 179/2 A
[51] Int. Cl.² ........................................ H04M 3/38
[58] Field of Search ............... 179/2 A, 2 R, 84 R, 179/18 D; 340/171 A, 171 PF

[56] References Cited

UNITED STATES PATENTS

| | | | |
|---|---|---|---|
| 3,654,396 | 4/1972 | Biezeveld | 179/18 D |
| 3,829,616 | 8/1974 | Blouch | 179/2 A |
| 3,849,764 | 11/1974 | Wang et al. | 179/2 A |
| 3,873,781 | 3/1975 | Nissim | 179/81 R |
| 3,927,264 | 12/1975 | Fish et al. | 179/2 A |

*Primary Examiner*—Kathleen H. Claffy
*Assistant Examiner*—Joseph A. Popek
*Attorney, Agent, or Firm*—Arthur A. Jacobs

[57] ABSTRACT

A system for screening out undesired signals from desired signals, the system being selectively programmed to effect this screening through programmed codes, the system also having means to utilize the desired signals to effect the performance of a selected function such as the sounding of a signalling means to indicate the transmission of the desired signals, the activation or deactivation of electrically controlled devices, or the actuation of a reprogramming means, the system being especially adapted to utilization in a telephone system for screening out undesirable calls and permitting desirable calls to effect activation of the selected functions.

11 Claims, 12 Drawing Figures

CODE-CONTROLLED DETECTION AND FUNCTION ACTUATING SYSTEM

This is a continuation-in-part of co-pending application Ser. No. 496,450, filed Aug. 12, 1974, now U.S. Pat. No. 3,936,617.

This invention relates to an attachment for telephones, and it particularly relates to such an attachment which is capable not only of screening out undesired telephone calls, but also of remotely controlling the functioning of various electrically actuated devices.

The system set forth in co-pending application Ser. No. 496,450 provided for the screening out of undesired telephone calls. However, it could only be used for an individual telephone instrument so that if more than one instrument was on a line, each instrument required its own attachment. It also required manual encoding to set up the proper code. In addition, it only either rang the phone bell itself or simulated its ringing so that the caller would believe that there was no one home. There was, furthermore, no indication if a call had been made unless the phone was answered, nor was it possible to use more than one code number.

It is one object of the present invention to overcome the above deficiencies by providing a system which can be used simultaneously with all phone instruments on a given line.

Another object of the present invention is to provide a system of the aforesaid type that can be programmed either manually or by remote control through the ordinary dial or touch-call apparatus.

Another object of the present invention is to provide a system of the aforesaid type which will effect complete silence or actuate any other type of signal, such as a busy signal or the like, when the correct code is not dialed or touch-call, so that there is no indication whether there is anyone at the number being called or not; thereby providing protection against possible burglaries.

Another object of the present invention is to provide a system of the aforesaid type which can be programmed for a plurality of different codes so that if a certain code refers to a certain party, it can be determined that such party has called if the phone is not answered.

Another object of the present invention is to provide a system of the aforesaid type which can be utilized to remotely control the functions or monitor the functions of various electrically-operated devices such as lamps, heaters, air-conditioners, ovens, and the like.

Other objects and many of the attendant advantages of this invention will be readily appreciated as the same becomes better understood by reference to the following description when read in conjunction with the accompanying drawings wherein:

FIG. 3 is a schematic view of the interface unit.

Figure 1:
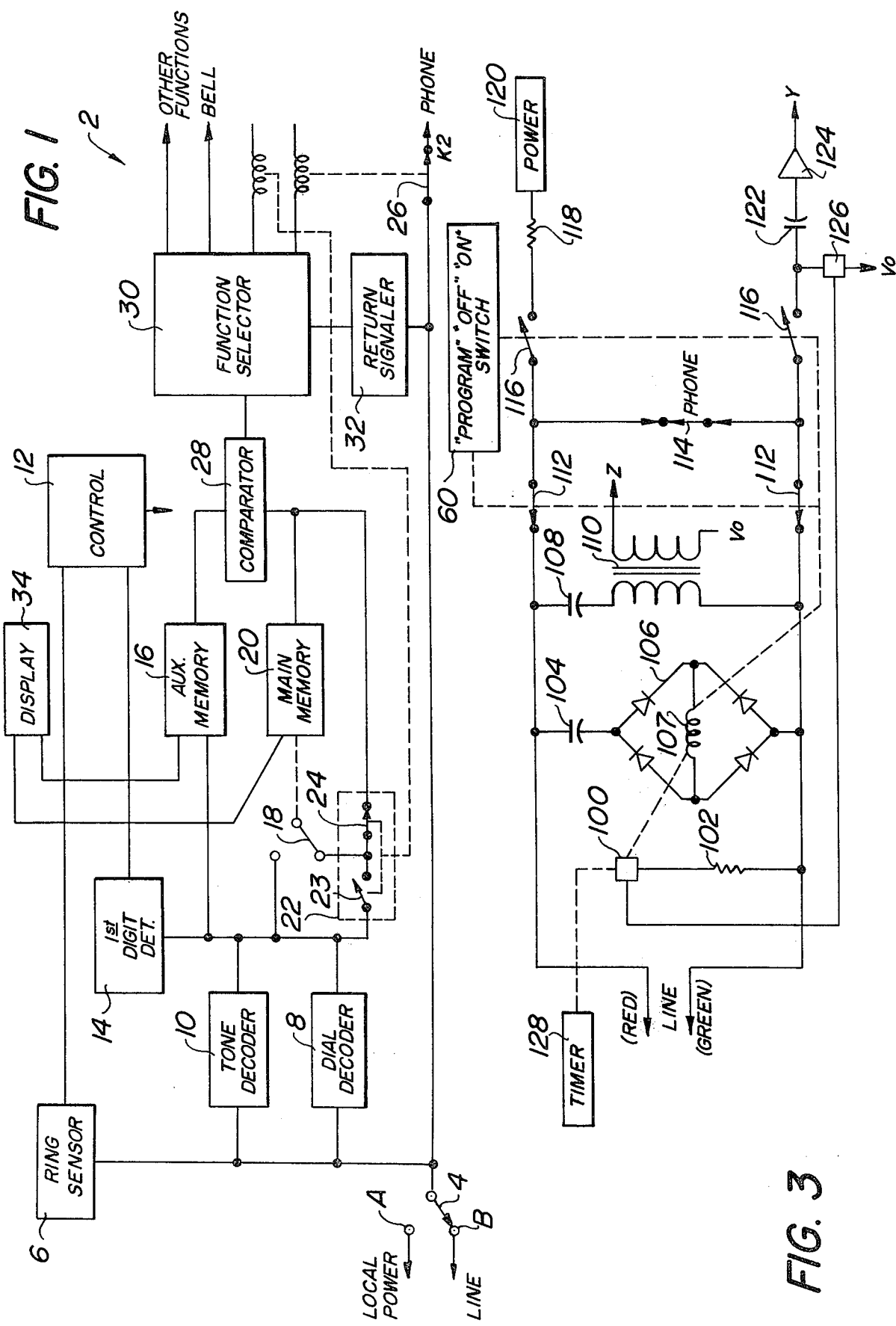
FIG. 1 is a diagramatic view of a system embodying the present invention.

In accordance with the present invention, the system may be programmed to enter both numbers to be recognized and functions to be performed by operating either the dial or push-buttons on the phone instrument itself or on a calling phone by remote control. In the event the phone itself is used, local power is provided so that the telephone system itself is not disturbed.

The term "dial" will hereinafter be used to generically describe either "dialing" or "touch-call", unless otherwise specifically denoted.

In accordance with the present invention, the device can be programmed to enter numbers to be recognized and functions to be performed by operating the dial or push-buttons on the telephone instrument, which, during this operation, is powered by local power so that the phone system itself is not disturbed. During this programming, the user operates a switch set for "programming" and the dialed phone pulses from the instrument pass through an appropriate decoder which converts the numbers into a binary serial form to be fed into the main memory of the system. The user then returns the switch to its normal position in the "on" position. Thereafter, when a ringing signal appears, initially nothing happens other than that a ringing sensor senses the ringing signal and operates a relay to open the circuit to the telephone ringer, thereby deactivating it. If a first single predetermined initial digit is transmitted, the digit is detected by the appropriate decoder and recognized by the first digit detector. This causes the return signaler to operate, which establishes an off-hook condition and simultaneously returns a signal to the calling party to indicate that the system has been activated. This signal is similar to the dial tone signal supplied to the calling party by the central office. The calling party can then dial an appropriate number of digits which are decoded and temporarily stored in an auxiliary memory.

The numbers stored in the main memory are cycled (or recirculated), as by connecting the output of a clocked shift register back into its input. A comparator compares each number as it comes from the main memory to the number in the auxiliary memory. If there is a match, the comparator passes the succeeding control digits from the main memory to the function selector, which, on the basis of the control digits, either rings a bell or other appropriate signal calling the party to the phone, or operates an appropriate function such as turning on a lamp, activating an oven, or the like, or monitors a device, or reports via the return signaler as to the status or condition of a device such as a burglar alarm system, the temperature of a room, etc., or refers a call, or operates the program switch to permit remote reprogramming of the main memory.

Additionally, the contents of the memories can be displayed, either with a numerical display, which shows the actual numbers which were dialed or touch-called during the user's absence, as well as the contents of the program in the main memory. Further, yet, certain numbers can be programmed to display individual lamps or annunciators which can be tagged with individual's names and return numbers.

The ringing sensor, first predetermined digit detector, return signaler, and display are not absolutely necessary for the fundamental operation of the device, but are optional features to provide additional functions. If desired, the device can be operated with only a tone decoder, or only a dial decoder, or with both, as shown, in order to provide appropriate flexibility utilizable with either system. Any type of random access memory can be substituted for the serial memories to also make the device operate. However, the inclusion of the above-mentioned optional features is preferred and is highly desirable for the most efficient and effective utilization of the system.

Referring now in greater detail to the drawings wherein similar reference characters refer to similar parts, there is shown in FIG. 1 a diagrammatic illustration of the sytem, designated generally as 2, which comprises a switch 4 movable from position A where the system can be programmed from the user's phone itself, using local power, to position B where the system can be programmed remotely from another telephone instrument through the ordinary telephone lines. When a dial is used, the pulses pass through a ring sensor 6 and then through a dial decoder 8, whereas, when touch-call is used, the pulses pass through the ring sensor 6 and then through tone decoder 10. The pulses from either decoder 8 or decoder 10 pass into a control unit 12 through a 1st digit detector 14, into an auxiliary memory unit 16, and, when a switch means 18 is in the closed position (not shown), into a main memory unit 20. A relay unit 22, having alternately open and closed switches 23 and 24, is provided in the memory circuit, while a normally closed switch 26 is provided in the phone circuit.

When switch 4 is as shown in FIG. 1 and switch 26 is closed, the phone instrument is connected to the telephone line and can be used normally. When switch 4 is as shown in FIG. 1 and switch 26 is open, ringing signals are prevented from being transmitted to the phone instrument.

The auxiliary memory 16 and main memory 20 are connected to a comparator 28 which is in circuit with the control unit, with the decoders and with a function selector 30. The function selector 30 is in circuit with the phone line through a return signaler 32 and the switch means 26. The auxiliary and main memories are also connected to a display unit 34 which is used to indicate the programmed information.

Figure 2:
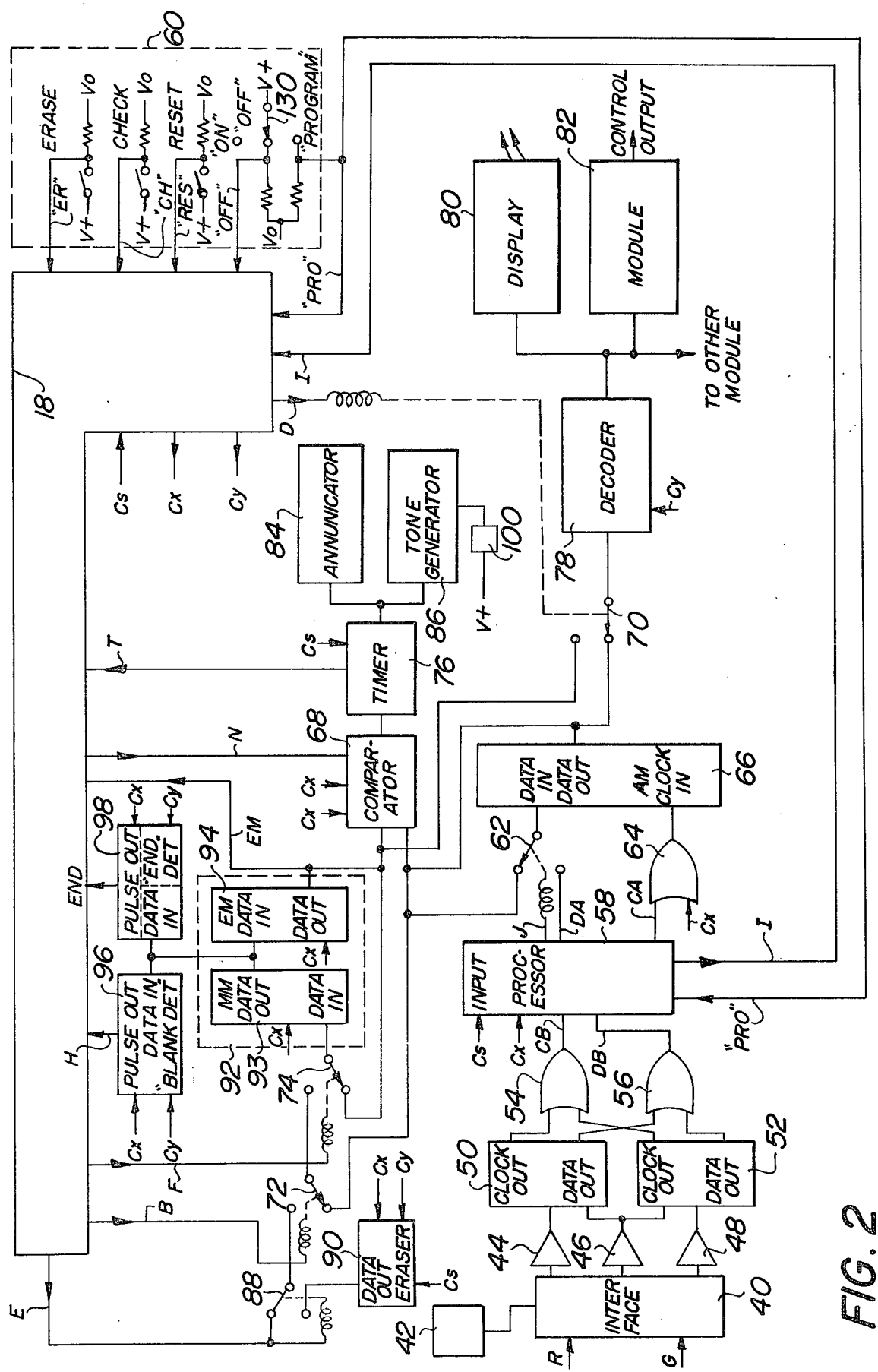
FIG. 2 is a more detailed schematic view of the system, but with the control unit not shown.

In FIG. 2 there is shown a more detailed diagram of the system, excluding the control means, which is hereinafter more fully described. As shown in FIG. 2, the red and green lines of the standard telephone system are connected to an interface 40 to which is connected a source of power indicated at 42, both comprising the ring sensor 6. The interface 40 sends signals through either compression amplifiers 44 or 46, if the signals are dialed, or through compression amplifiers 46 or 48, if the signals are touch-call, to either dial decoder 50 or touch-call decoder 52. These, in turn, actuate OR gates 54 and 56, the first of which applies a clock pulse, designated $C_B$, and the second of which applies a data pulse, designated $D_B$, to an input processor indicated at 58.

It is here to be noted that although the term "touch-call" is used throughout this disclosure, the term is used in a generic sense to include not only tones provided by push-button but any type of tone signalling, such as "multifrequency numerical code", etc. The primary differences among the various tone signalling systems are the specific frequencies used and the aspect ratios of the various matrices.

A clock pulse $C_s$, emitted by an oscillator or the like, which constitutes a continuously running clock, and a main cycle pulse, designated $C_x$, which is generated by the control unit 12, are applied to the input processor 58 which emits a "completed input" signal designated I. This input signal I is applied to the control unit 12.

The input processor is connected to a selector switch unit, generally designated 60, and is also connected to a switch 62 and an OR gate 64. The switch 62 and OR gate 64 apply appropriate signals to an auxiliary memory 66, corresponding to 16 in FIG. 1, which is in circuit with a comparator 68, corresponding to 28 in FIG. 1, and a switch 70. The comparator 68 is also in circuit with switches 72 and 74 and with a timer 76. The switch 70 is connected to a decoder 78 which controls the display unit 80 and the auxiliary modules 82. The timer 76 is in circuit with an annunciator 84 and with a tone generator 86, and is used to stop the action of the annunciator or tone generator after a predetermined period of time. For example, it stops the phone from ringing after a period of time.

The switch 72 is connected to switch 88 in circuit with an eraser unit 90. The switch 88 is connected to switch 72 which is connected to switch 74. The switch 74 is in circuit with the main memory unit 92, corresponding to 20 in FIG. 1, which consists of a main portion 93 and an extension portion 94 in circuit with each other. The main memory is in circuit with a "blank" detector 96 and an "end" detector 98.

Referring more specifically to the construction and operation of the various units, the interface, generally designated 40, is shown in FIG. 3 and comprises a normally open relay 100 in series with a resistor 102. This relay and resistor are connected between the red and green lines of the telephone system in parallel with a capacitor 104 and a rectifier bridge 106 having a relay coil 107 operating the relay 100. In parallel with rectifier bridge 106 is a capacitor 108 in series with a transformer 110. A pair of normally closed, simultaneously-acting relay switches 112 are provided in the red and green lines on one side of the normally-closed phone instrument switch 114, while simultaneously-acting, normally-open relay switches are provided at 116 at the opposite side. The switches 112 and 116 are parts of the same relay unit.

Relay switch 116 is connected through resistor 118 to a source of local power 120, corresponding to power source 42, and is also connected through a capacitor 122 to an amplifier unit indicated at 124 (amplifier unit 124 being synonymous with amplifier 46 in FIG. 2). The relay 100 is in circuit with a set of normally closed contacts of a relay 126 which is connected both to ground and to the green line between switch 116 and capacitor 122. The relay 100 has a set of contacts connected to a timer 128. The switches 116 are connected to the selector switch unit 60.

As indicated above, normally the relay switches 112 are closed and the relay switches 116 are open, whereby the phone is connected to the phone line and can be used normally. If relay 100 is open, resistance 102 does not affect the line, while the bridge 106 and the transformer 110 have sufficiently high impedance at audio frequencies so that they do not affect the line through their respective coupling capacitors 104 and 108 which represent an open circuit for direct current.

Assuming that the selector switch 60 is not in the "program" position, when a ringing signal appears across the line, the bridge 106 is operated to actuate one set of contacts of relay 100. Relay 100 thereupon connects resistance 102 across the line, thereby performing an action similar to taking the handset of the telephone instrument off the hook. This action prevents any ringing signals from proceeding up the line. Simultaneously, another set of contacts of relay 100 operate the switches 112 and 116 to close, thereby disconnecting the telephone instrument from the telephone line and connecting the instrument in series with the power supply 120 (generally 50 volts), the current-limiting resistor 118, and the coil of relay 126. Since the telephone instrument handset is still "on-hook," there is no D.C. path through the instrument and the relay 126 is not operated. However, a third set of contacts of relay 100 act, at this time, to electrically lock relay 100 so that it remains operated.

A fourth set of contacts of relay 100 start the timer 128 when the ringing signal appears as described above, this timer being preset for a particular period of time, such as, for example, 50 seconds. If nothing happens during this period of time to cause relay 100 to drop out, at the end of the period, a set of normally closed timer contacts opens, causing relay 100 to drop out (become inoperative), thereby removing resistance 102 from across the line and causing the relay containing switches 112 and 116 to drop out. This restores the normal connections of the phone instrument to the line.

If prior to the expiration of the aforesaid time period, the phone is answered by lifting the handset, a D.C. connection is made through the normally closed switch 114 so that a path for current is provided to relay 126. The normally closed contacts of relay 126 caused relay 100 to drop out, thereby restoring the phone instrument and line to a normal condition, as before the ringing of the bell.

If, during the time that relay 100 is operative, tones, clicks or click transients (such as from dialing) are sent down the telephone line, they will be coupled through capacitor 108 and transformer 110 to the line indicated as Z. The signals pass through line Z to the compression amplifiers 44 and 48, and, after amplification, are passed to the appropriate decoder 50 or 52. If, in addition, the selector switch unit 60 is placed in the "program" position, the switches 116 will be closed to make the power supply 120 available to operate any push-button or dial equipment in the instrument to provide signals which are passed by capacitor 122 through amplifier 124 to be combined with the other signals passing to the decoders.

Referring to FIG. 2, the selector switch unit 60 has a switch blade 130 movable between three positions, namely "Program", "Off" and "On". There are also three momentary switches or push-buttons indicated at "Reset", "Check" and "Erase". There are approximately nine basic operations which can be performed by these switches, as follows:

1. Reset — Depressing the "Reset" button when the selector switch is in the "Program" position causes switches 72, 74 and 88 to operate and to pass the output of the eraser 90 to the input of the main memory 92. The main memory 92 and the auxiliary memory 66 are all standard type static shift registers. The eraser circuit produces a predetermined or unique word which is transferred bit serially into the main memory. The unique word is followed by all zero or false bits. The "end" unit 98 monitors the output of the main portion 93 of the main memory. When the unique word entered by the eraser clears the output of the main portion 93 of the main memory, it is recognized by the "end" circuit, which thereupon, produces a pulse that causes everything to stop, thereby leaving all zeros in the main portion 93 and the unique word stored in the extension portion 94. The extension portion 94 and the auxiliary memory 66 are the same length, namely, one word. However, the main portion 93 of the main memory may be of any length desired.

2. Program — The memory is programmed with any desired numbers by means of the telephone instrument itself by placing the selector switch in the Program position and dialing or touch-calling a number, which is recognized and decoded by either the dial or touch-call decoders. The number is passed out of the appropriate decoder in synchronism with the clock pulses generated by the decoder, which pass through the input processor 58 which operates switch 62 and passes the data bits into the auxiliary memory 66, while also passing the clock pulses from the decoder to the auxiliary memory. A word is one bit greater than the number of bits required to represent a number in octal. In octal coding, a digit requires three bits. This particular design uses three-digit numbers; therefore, a number requires nine bits for representation and a full word requires ten bits. Making the parts larger or smaller would accommodate other-sized words, while only the main memory size needs to be changed to change the number of words which can be remembered.

After the nine bits, which represent the three-digit octal number, are passed into the auxiliary memory 66, the input processor 58 then produces a pulse which starts clock pulses appearing on Line $C_x$ and deenergizes switch 62. In this manner, the output of the auxiliary memory is recirculated. Similarly, the output of the main memory is connected through switch 74 to the input of the main memory 92, so that the contents of the main memory are also recirculated.

The "blank" detector 96 monitors the output of the main portion 93 of the main memory 92. When the "blank" detector detects ten false bits in sequence, it produces a pulse, which causes switch 74 to operate for the next 10 $C_x$ pulses, in such manner, substituting the contents of the auxiliary memory 66 for the blank which was in the extention portion 94 and is now lost.

The memories then continue to recirculate until the unique word is detected by the "end" detector 98, which stops the $C_x$ pulses. Additional numbers can be programmed into the main memory 92 by repeating the same process.

While the word stored in the auxiliary memory was being cycled, that word was also cycled through switch 70 into the decoder 78 which operates the display 80, thereby displaying the number stored so that the operator may see that a correct number (or incorrect number, as the case may be) has been entered into the device.

3. Program Checking — Any time after the device has been programmed the numbers which are stored in the main memory may be displayed as follows: by placing the selector switch 130 in the Program position and depressing the Check button. Depressing the Check button causes $C_x$ clock pulses to start and the contents of the main memory 92 to be recirculated. Switch 70 is operated so that the output of the main memory 92 is fed to the decoder 78 and displayed. The main memory 92 is also monitored by logic which stops $C_x$ clock pulses whenever a "true" level is detected during the tenth bit. Pushing the Check button again starts the $C_x$ clock pulses until the unique word is detected, which stops everything. In this manner, each word placed in the main memory 92 is displayed upon command by depressing the Check button. Blanks (all zeros) are not displayed since the tenth bit is not true.

4. Program Erasure — After pressing the Check button, with the selector switch in the Program position, a number will be displayed. The number displayed is stored in the extension portion 94 of main memory 92. Depressing the Erase button causes switches 72 and 74 to operate and ten $C_x$ clock pulses to occur. Line E leading into switch 88 may be considered at ground potential (that is, logic zero, or false). Therefore, 10 zeros are substituted for the word which was previously in the extension portion 94. The next programmed word in the memory can be checked by pushing the Check button and erased or not erased, as desired, by pressing the Erase button.

5. Called-in Number Not Recognized — When a caller calls the telephone line to which the present system is connected, the caller may dial or touch-call a number, which will be decoded by the appropriate decoder and passed into the auxiliary memory 66 via the input processor 58 in the same manner as a programmed number; however, if the selector switch is in the On position, the input processor 58 will make the tenth bit zero instead of one. $C_x$ clock pulses are then produced, with the new incoming number recirculated through the auxiliary memory 66, while the previously stored numbers are recirculated through the main memory 92, both in synchronism. The outputs of the main memory 92 and the auxiliary memory 66 are monitored by the comparator 68. If the first nine bits of a word from both the auxiliary memory 66 and the main memory 92 are identical and the tenth bit from the main memory 92 is true, then the comparator 68 produces a pulse. If there is no such comparison, then $C_x$ clock pulses continue until the unique word is recognized by the "end" circuit 98, stopping everything.

6a. Call Recognized but Not Answered — If instead of the above, the comparator 68 does find a pair of identical first nine bits and finds a tenth bit from the main memory 92 to be true, the comparator 68 produces a pulse which starts the timer 76. This timer 76, in turn, operates the annunciator 84 to call a party to the phone. The annunciator can be a bell, a tone, or any other signalling device. If the phone is not answered by removing the handset off the hook, the timer 76 will complete its timing at the end of one minute and initiate the same memorization cycle as during programming (described above) so that the number in the auxiliary memory 66 is placed in the next blank space in the main memory 92, except that the tenth bit is false.

6b. Call Recognized and Answered — If the call is answered before the timer 76 reaches its preset time, everything is reset and the number is not remembered by the main memory.

7. Display of Stored Call — By placing the selector switch in the Off position and pressing the Check button, the same cycle is initiated as in program checking (described above), with the exception that the cycling is stopped only when the tenth bit is a zero. In this manner, only calls which were remembered when the selector switch 130 was in the On position are displayed and the numbers which were remembered when the selector switch 130 was in the Program position are not displayed.

8. Erasure of Stored Call — When the selector switch is in the Off position and the Check button has been depressed, causing a number to be displayed, the displayed number can be erased in the same manner as described above by pressing the Erase button.

9. Module Operation — In addition to displaying a number, a number can cause an auxiliary device (module), indicated at 82, to be operated. Different auxiliary devices can be programmed to operate from different numbers so that with such modules various auxiliary devices, such as for feeding fish, turning on a stove, etc., may be operated individually.

Additionally, the tone generator 86, corresponding to return signaller 32 of FIG. 1, may be added. This is operated by relay 100 in such manner that the tone is fed back down the phone line when a call is received. The tone is deleted upon recognition of a number if the phone is answered. The tone generator can, if desired, be constructed to simulate a busy signal or any other desired signal.

Figure 4:
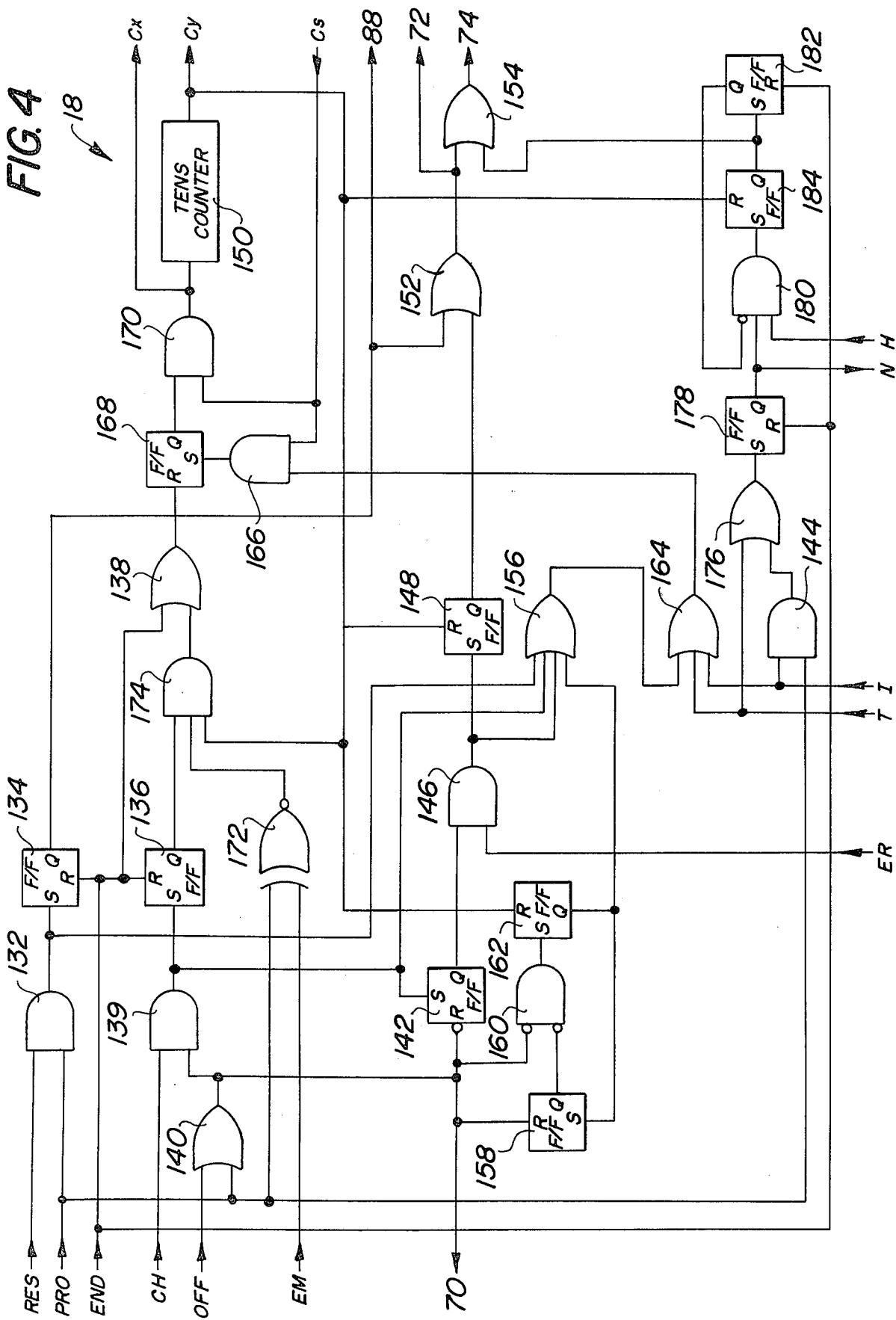
FIG. 4 is a schematic view of the control unit.

The $C_x$ clock pulses and other control functions are provided by the control circuit 18 which is illustrated schematically in FIG. 4. As shown in FIG. 4, the circuit includes an AND gate 132 connected to lines RES and PRO from switch unit 60. It is also in circuit with a flip-flop 134 which is in circuit with a flip-flop 136 as well as with the line "end" and with an OR gate 138. The flip-flop 134 additionally provides an output to switch 88 (see FIG. 2) operating as the main memory reset selector switch. An AND gate 139 is connected to line CH as well as to an OR gate 140 and a flip-flop 142. The OR gate 140 is connected to line OFF and also to AND gate 144. The flip-flop 142 is connected to the display input selector switch 70 and also to an AND gate 146 which is, in turn, coupled to a flip-flop 148 and to line ER.

The flip-flop 148 is connected to the output $C_y$ from a "tens counter" 150 and also to an OR gate 152. The OR gate 152 transmits pulses to the main memory transfer blank selector switch 72 and also applies an output to OR gate 154 which applies its output to the main memory transfer switch 74 connecting the main memory to the auxiliary memory selector. The AND gate 132 is also in circuit with an OR gate 156 which is also in circuit with flip-flop 142 and AND gate 146. In addition, the OR gate 156 is in circuit with a flip-flop 158 which is coupled to an AND gate 160 that is, in turn, coupled to a flip-flop 162.

The OR gate 156 provides an output to an OR gate 164 which is also in circuit with the timer 76, as indicated at T and with the output I from the input processor 58. The output from OR gate 164 is applied to an AND gate 166 which receives the clock pulse $C_x$ from the oscillator (not shown) and applies its output to a flip-flop 168 in circuit with the OR gate 138. The output from flip-flop 168 is applied to an AND gate 170 which also receives an input $C_s$, and the output from gate 170 is utilized as the $C_x$ clock pulse as well as being applied to the tens counter 150 to produce the pulse $C_y$.

The output from the main memory, indicated as line EM, is applied to an exclusive NOR gate 172 which is also in circuit with line from the switch unit 60. The gate 172 provides an output which is applied to an AND gate 174 that is also in circuit with the flip-flop 162 and the output $C_y$. The output from gate 174 is applied to OR gate 138.

The AND gate 144 receives an input from line I as well as from line PRO and from the gate 164, and provides an output to an OR gate 176 which also receives an input from gate 164. The output from gate 176 is applied to a flip-flop 178 in circuit with the end detector. The output of flip-flop 178 is applied to the comparator inhibit, by line N, and also to an AND gate 180. The AND gate 180 is in circuit with a flip-flop 182 which receives an output from a flip-flop 184 that, in its turn, receives an input from gate 180. The gate 180 also receives an input from the blank detector, by line H.

The above-described control unit operates as follows:

Main Cycle

Initiated by:

A. Selector switch in Program or Off position plus check button depressed—lines PRO or OFF true, causes OR gate 140 to be true, which in turn, with line CH true, makes AND gate 139 true;

B. ER true preceded by selector switch in the Program position or Off, plus depression of the Check button, making gates 140 and 138 true, sets flip-flop 142, which enables AND gate 146 to be true when line ER is true;

C. Changing the selector switch to the On position causes OR gate 140 to go false, making AND gate 160 true, since flip-flop 158 is reset, thus setting flip-flop 162 (which is reset by the net $C_y$ pulse); a true output of flip-flop 162 sets flip-flop 158, which inhibits AND gate 160 until flip-flop 158 is reset by the selector switch being placed in the Program or Off position, which makes OR gate 140 true;

D. Placing the selector switch in the Program position and depressing the Reset button causes AND gate 132 to be true;

E. Line T true; or

F. Line I true;

then AND gate 139 being true, AND gate 146 being true, flip-flop 162 being set, AND gate 132 being true, line T being true or line I being true, causes OR gate 156 and/or 164 to be true, which causes AND gate 166 to be true when $C_s$ is next true; AND gate 166 being true, sets flip-flop 168, which enables AND gate 170, so that $C_x$ follows $C_s$, and $C_x$ operates the tens counter 150 to produce, on LIne $C_y$, a pluse coincident with each tenth $C_x$ pulse.

Stopped by

A. Line END true, which makes OR gate 138 true, which resets flip-flop 168, making AND gate 170 always false, so that the $C_x$ clock line no longer reflects the $C_s$ clock line; or B. After the selector switch is placed in the Program or Off position, making OR gate 140 true, plus the depression of the Check button, making line CH true, AND gate 139 is made true, which sets flip-flop 136; AND gate 174 is true during clock pulse $C_y$ if exclusive NOR gate 172 is true because the PRO and EM lines are the same (both true or both false) which makes OR gate 138 true as in A) above.

Memory Cycle

If Timer Initiated

A. Line T true makes OR gate 176 true, which sets flip-flop 178, which makes line N true;

B. Line H true, together with flip-flop 178 true and flip-flop 182 false, makes AND gate 180 true, which sets flip-flop 184, which 1. Makes OR gate 154 true, operating switch 74 (see FIG. 2) to transfer the auxiliary memory to the main memory until flip-flop 184 is reset by the next $C_y$ pluse and
2. The output of flip-flop 184 being true, sets flip-flop 182, which inhibits AND gate 180 so that flip-flop 184 cannot be again set by line H being true;

C. The same pulse on line END which stops the main cycle also resets flip-flops 178 and 182 to restore the original conditions.

If Program Initiated:

A. Placing the selector switch in the Program position makes line PRO true, which when line I is true, makes AND gate 144 true, making OR gate 176 true and setting flip-flop 178, initiating the same sequence as in B) and C) above.

Erase

Lines PRO or OFF being true makes OR gate 140 true, which with line CH true makes AND gate 139 true, setting flip-flop 142; if, then, line ER becomes true, AND gate 146 is true, which sets flip-flop 148, which makes OR gate 152 true, operating switch 72; and OR gate 152 being true makes OR gate 154 true, which operates switch 74 until flip-flop 148 is reset by the next $C_y$ pulse.

Reset

Placing the selector switch in the Program position makes line PRO true, which, in addition to depressing the Reset button, making line RES true, makes AND gate 132 true, which sets flip-flop 134. Making AND gate 132 true initiates the main cycle, as described previously. Making flip-flop 134 true also operates switch 88 and makes OR gate 152 true, which operates switch 72 and makes OR gate 154 true, which operates switch 74 until flip-flop 134 is reset by a pulse on line END.

Display Source

Placing the selector switch in the Program or Off position makes lines PRO or OFF true, thus making OR gate 140 true and operating switch 70.

The various control functions described above are utilized as follows: 1. Reset is accomplished by putting the selector switch in the Program position, which makes line PRO true, and depressing the Reset button, which makes line RES true, initiating the sequence described above under Reset and Main Cycle. This causes switches 72, 74 and 88 to operate, so that the output of the eraser 90, which consists of a unique word followed by all zeros, is caused to be cycled into the main memory 92 until the unique word is detected by the END circuit, thus causing the Main Cycle to cease, leaving the main portion 93 of the main memory filled with zeros and the unique word in the extension portion 94.

2. Program—To program a word consisting of several numbers into the mian memory, the selector switch is placed in the Program position, making line PRO true. A number is then dialed or touch-called and detected and passed through the input processor 58 to the auxiliary memory 66, plus a tenth or last bit which is true. At the conclusion of the entry into the auxiliary memory, a pulse is produced by the input processor 58 on Line I, initiating the Main Cycle so that the memories are cycled until the blank detector 96 senses that the last ten bits entered into the extension portion 94 are zeros, whereupon the blank detector makes line H true, initiating the Memory Cycle, as described above. This causes the contents of the auxiliary memory to be substituted, via switch 72, which is off, and switch 74, which is on, into the main memory in place of the ten zeros previously contained in the extension portion 94. Switch 74 then reverts so that the output of the main memory again recirculates back into the main memory input until the unique word is detected from the main memory by the END circuit, causing the Main Cycle to cease.

3. Program Check—To check the contents of the main memory by displaying the programmed numbers in the main memory (i.e., the words where the last bit is true), the following is done: Place the selector switch in the Program position, making line PRO true, and depress the Check button, making line CH true, which causes the Main Cycle to start and to stop, as described above. Simultaneously, switch 70 is operated so that the output of the main memory is fed through the display decoder to the display which displays the last number cycled into the decoder before the Main Cycle is stopped.

4. Erasure of Programmed Word—Firstly, checking a word causes AND gate 139 to be true, which sets flip-flop 142, permitting AND gate 146 to become true when ER is made true by pressing the Erase button. This, as described above, causes the Main Cycle Control to operate for ten $C_r$ pulses, with switches 72 and 74 operating and line E being false, thus supplying the main memory data input with ten sequential zero bits.

5. Call Not Recognized—With the selector switch in the On position, the call, as described previously, is processed to provide a number in the auxiliary memory, at the conclusion of which the input processor makes line I true, initiating the Main Cycle so that bits are fed in synchronism from the main and auxiliary memories to the comparator 68. Since there is no comparison, no output is produced from the comparator and the main cycle ends upon the detection of the unique word.

6a. Call Recognized but Not Answered—If, however, the first nine bits of a word fed by the auxiliary and main memories to the comparator are found to be identical and the tenth bit from the main memory is true, then a pulse is produced by the comparator, which starts the timer 76, which, in turn, operates the annunciator 84 and, if connected, a tone generator, as described previously. If there is no off-hook condition, at the end of the timer's pre-set time, line T is made momentarily true, making OR gates 164 and 176 true. This initiates the Main Cycle, and upon detection of ten zeros by the blank detector, starts the Memory Cycle to substitute the word stored in the auxiliary memory in place of the one stored in the extension portion 94 into the main memory by operation of switch 74 for ten clock pulses. The setting of flip-flop 178 makes line N true inhibiting the comparator so that the timer cannot be restarted during the second main cycle, which is for the purpose of memorization.

6b. Call Recognized and Answered—If instead during the timer's preset time the phone handset is taken off the hook, relay 126 (see FIG. 3) operates, resetting the timer so that line T is not made true.

7. Stored Call Displayed—Placing the selector switch in the Off position and pressing the Check button initiates the same cycle as for checking programmed numbers, except that because line PRO is false, exclusive NOR gate 172 is true only if line EM is false.

8. Stored Call Erased—A stored call is erased identically to that described with regard to erasure of a programmed word.

9. Modules—The modules 82 are decoded and operated in the same manner as the display 80.

Figure 5:
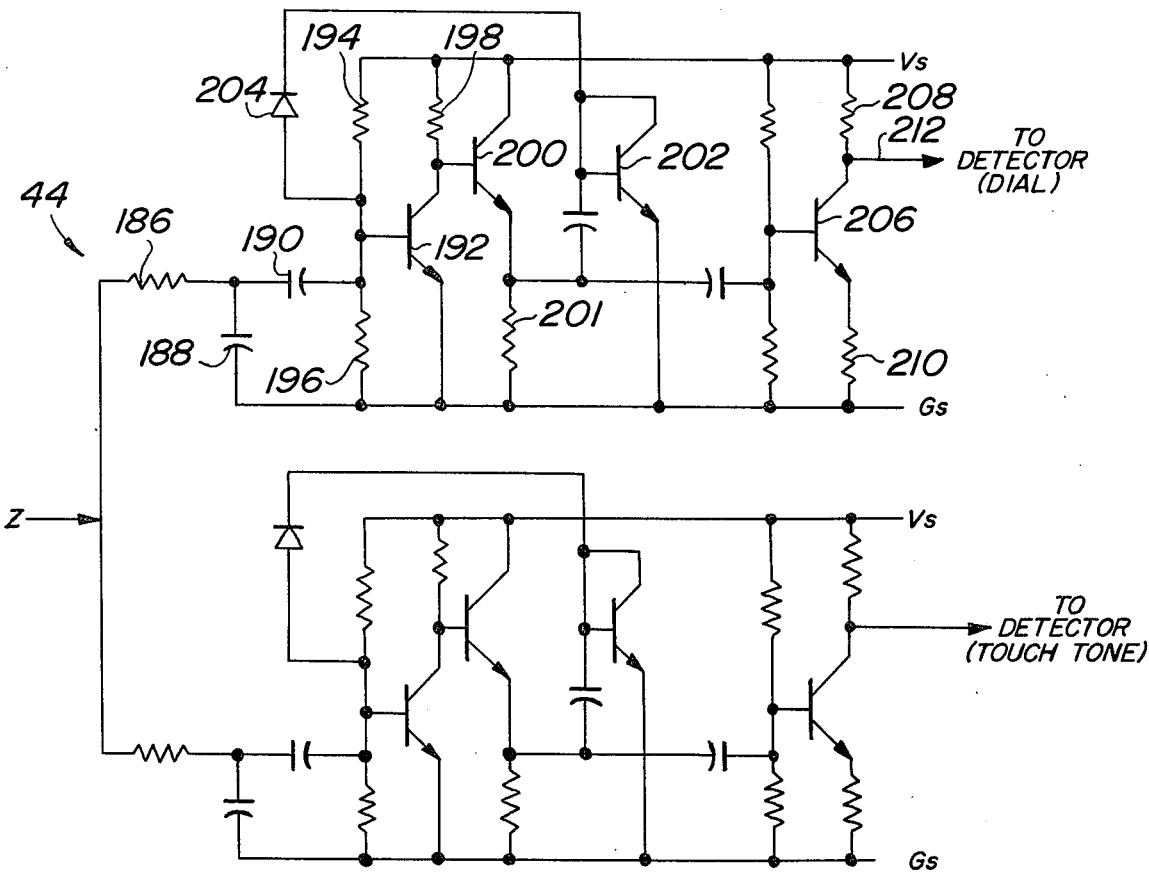
FIG. 5 is a schematic view of the composition amplifiers.

The compression amplifiers used in the present system are of the same type disclosed in the parent application, Ser. No. 496,450. As shown in FIG. 5, they comprise two similar units connected to the line Z leading from the interface. Since the units are basically the same, a description of the upper or dial unit will serve as a description of the lower or tone unit.

The line Z is an input to a resistance 186 connected to a capacitor 188 for filtering. The signal is applied through a capacitor 190 to the base of a transistor 192 which is initially biased by resistors 194 and 196, the voltage gain being determined by the ratio of a collector resistor 198 to the transistor emitter resistance. The emitter resistance is inversely proportional to the base voltage, whereby any decrease in base voltage will cause an increase in emitter resistance and a decrease in voltage gain.

The transistor 192 is coupled to a transistor 200 which serves as a standard emitter follower to permit impedence amplification that allows the use of a large collector resistor 198 for transistor 192, thereby reducing the current flow. The output of the emitter follower is capacitively coupled to a standard voltage doubler circuit consisting of transistor 202 connected as a diode plus a standard series diode 204. The capacitor 190 here acts as a filter capacitor for the voltage doubler in addition to the other input coupling functions.

The voltage doubler circuit is arranged to produce a negative voltage so that when the signal on the emitter of transistor 200, which is biased by resistance 201, increases, a negative D.C. voltage is produced across the capacitor 190 and on the base of transistor 192, thereby causing the gain of the transistor stage 192 to decrease. Since the action is logarithmic, a change in voltage at the input of the amplifier by a factor of 200 causes a change of less than 25% at the output of the amplifier. A transistor 206 and its associated resistors 208 and 210 form a standard audio-frequency amplifier.

The output from the compression amplifier is indicated at 212, this output being applied to the detector 50. In similar manner, when the lower network shown in FIG. 5 is utilized, the output is applied to the detector 52.

Figure 6:
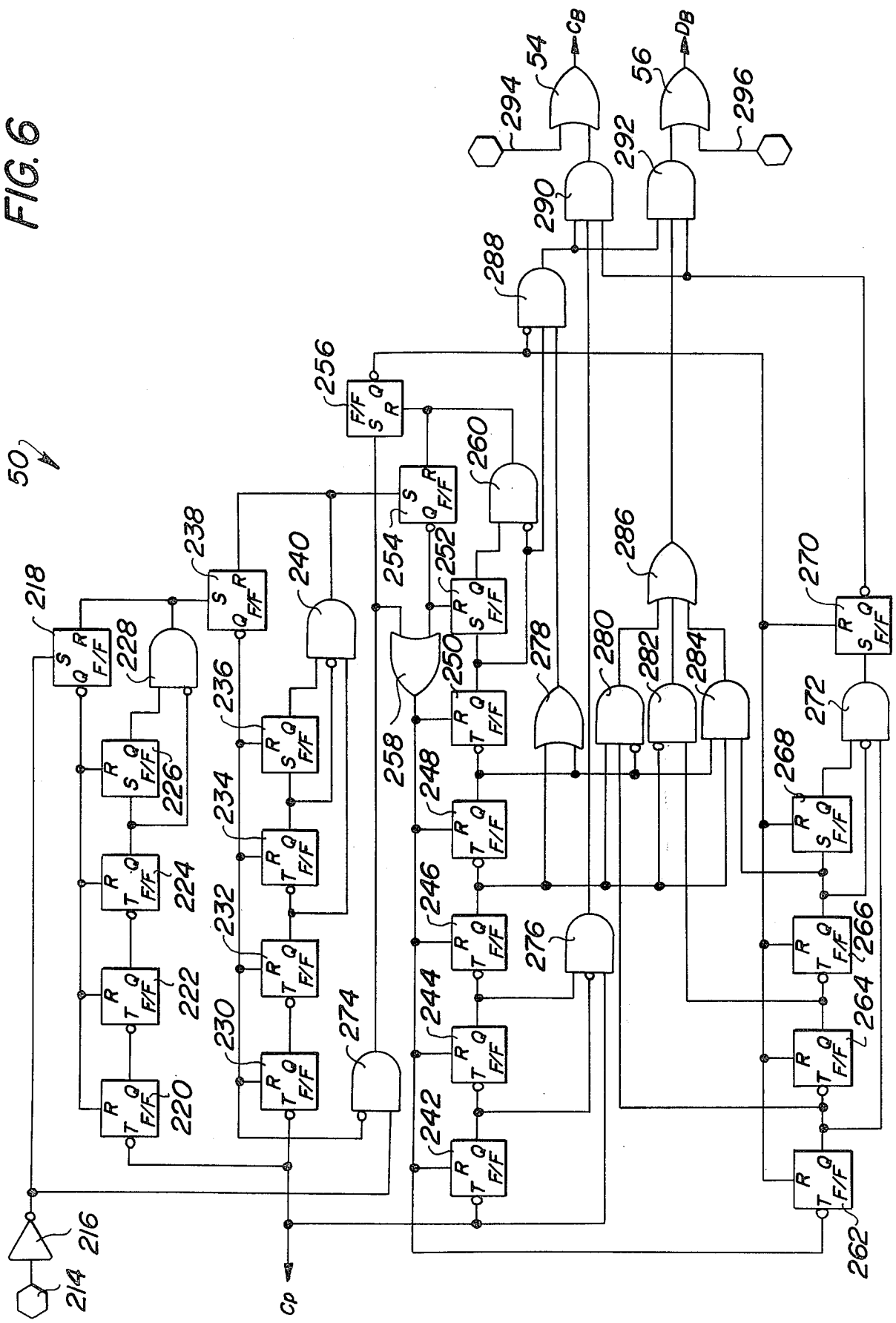
FIG. 6 is a schematic view of the detectors.

The detectors 50 and 52 are similar so that a description of one will serve as a description of the other. Taking the dial detector 50 as a representative, this network is shown in FIG. 6 and comprises a terminal 214 connected to the output 212 of the compression amplifier shown in FIG. 5. The pulses indicated at $C_P$ are generated by a source of 120 Hz pulses. Such pulses may be derived from a 60 Hz power line by any method of frequency doubling, as, for example, by means of a full-wave rectifier.

The pulses from 214 are applied through an amplifier 216 to a flip-flop 218 which, in combination with a set of series connected flip-flops 220, 222, 224 and 226, and an AND gate 228, comprises a first counter. A second counter comprises flip-flops 230, 232, 234, 236 and 238 plus an AND gate 240. A third counter comprises flip-flops 242, 244, 246, 248, 250, 252, 254 and 256 plus OR gate 258 and AND gate 260. A fourth counter comprises flip-flops 262, 264, 266, 268 and 270 plus AND gate 272. An AND gate 274 serves as an acceptance gate, while output decoding is accomplished by AND gates 276, 278, 280, 282 and 284 plus OR gate 286, AND gates 288, 290 and 292. Gate 276 produces clock pulses while gates 280, 282, 284 and 286 produce data levels which are respectively inhibited by gates 290, and 292. Both gates 290 and 292 are controlled by gate 288.

The OR gates receiving the inputs from AND gates 290 and 292 are the OR gates 54 and 56 shown in FIG. 2, the outputs being on the clock line $C_B$ and the data line $D_B$ applied to the input processor 58. The lines 294 and 296 leading respectively into OR gates 54 and 56 are the clock and data lines connected to the outputs of the touch-tone detector 52.

The detector detects one digit at a time, immediately producing three bits representing the digit at the conclusion of detection. The first two counters act as a filter so that only dial pulses of a proper frequency will be detected. The first pulse is always lost, whereby inadvertant or random noise pulses are not detected as dial pulses. The first three counters may be considered as being the digital equivalent of analog monostables. In other words, when triggered, an output of fixed, pre-determined duration is produced. The output of the first counter triggers the second counter. The output of the second counter enables the acceptance gate, 274, so that if the output of the second counter is false, then a dial pulse is passed through gate 274. If the pulses are at the wrong speed, or come at improper timing intervals, they will not be passed through the acceptance gate. The passage of the first accepted pulse (in other words, the second dial pulse) starts the third counter. However, each time a dial pulse is accepted by gate 274, the third counter is reset to 0, thus making it start its count all over again. The second and third counters, like the first counter, also count clock pulses. In addition, each accepted dial pulse is counted by the fourth counter.

At the conclusion of the last dial pulse, the third counter is no longer reset to 0 by any succeeding pulses, and so can count to its conclusion. The last 12 counts of the third counter are used to operate the output conversion circuits. Clock pulses are derived from the third counter and occur regularly for every fourth $C_P$ pulse, after the conclusion of the last dial pulse. Gate 244 is true during the last 12 clock pulses of the third counter's count and enables the last 3 clock pulses from gate 276 to be passed onward to the input processor on line $C_B$. Simultaneously, the third counter causes the data gates to sequentially sample the status of the flip-flops in the fourth counter, producing the data levels, which, like the clock pulses, are gated by the level of gate 288 to produce a data output on line $D_B$. The clock pulses occur just past the middle of the data pulse, so that there are no inherent race conditions.

Since the acceptance gate, 274, is enabled by the second counter, a filter is formed whereby only dial pulses will be accepted where the duration between the start of each pulse lies between predetermined limits. This is equivalent to saying that dial pulses at speeds between such limits will always be accepted, whereas pulses at speeds slower or faster than said limits will never be accepted. A predetermined time after the beginning of the last dial pulse, gate 288 is operated to pass the number out of the decoder.

The functioning of the decoder described above is as follows: A dial pulse enters at 214 and is inverted by amplifier 216 which sets flip-flop 218, which releases flip-flops 220, 222, 224 and 226 so that $C_P$ pulses entering flip-flop 220 can be counted on their trailing edges. Eventually, flip-flop 224 becomes true, setting flip-flop 226. However, gate 228 remains false until flip-flop 224 again becomes false, at which time flip-flop 218 is reset and flip-flop 238 is set, releasing flip-flops 230, 232, 234 and 236 so that they may count the trailing edges of $C_P$ pulses. Additionally, the output of flip-flop 238 enables gate 274 so that any true levels from amplifier 216 can be passed by gate 274. Eventually, flip-flop 234 becomes true, setting flip-flop 236. However, gate 240 remains false until flip-flop 234 becomes false and flip-flop 232 becomes true, at which time flip-flop 238 is reset and flip-flop 254 is set. The outputs of flip-flop 254 and gate 274 are combined by gate 258 to hold flip-flops 242, 244, 246, 248 and 250 in a reset condition. Assuming gate 274 to be false when flip-flop 254 is set, gate 258 becomes false so that flip-flops 242, 244, 246, 248 and 250 may count $C_P$ pulses. Eventually, the output of flip-flop 250 becomes true, setting flip-flop 252; however, gate 260 remains false until flip-flop 250 becomes false, at which time flip-flop 254 is reset, concluding operations. Howevr, any dial pulses which are passed by gate 274, are also passed by gate 258, resetting flip-flops 242, 244, 246, 248 and 250 so that the output of flip-flop 250 is prevented from becoming true as long as there are recurring accepted dial pulses. Additionally, the first dial pulse that causes gate 274 to be true sets flip-flop 256, which had been holding flip-flops 262, 264, 266, 268 and 270 in a reset condition so that that pulse and any subsequent dial pulses which cause gate 274 to become true, and therefore gate 258 to become true are counted on their trailing edges by flip-flops 262, 264 and 266.

The fourth trailing edge of an accepted dial pulse causes flip-flop 266 to become true, setting flip-flop 268. However, AND gate 272 remains false until such time as flip-flop 266 again becomes false and flip-flop 262 becomes true, which would represent the receipt of a 10 dial pulse. Since nine dial pulses is the maximum to be accepted (because one dial pulse is always deleted), that means that there are in actuality only eight numbers that can exist in each digit. The extra dial pulse causes gate 272 to become true, setting flip-flop 270, which inhibits gates 290 and 292 so that there can be no output until a new and correct number is dialed.

Flip-flops 242 and 244 represent a digital frequency divide-by-4 counter such that gate 276 passes only every fourth $C_p$ pulse, assuming that flip-flops 242 and 244 have not been reset by an accepted dial pulse from gate 274. Gates 278 and 288 together combine the outputs of flip-flops 246, 248 and 250, such that gate 288 is true only during the last 12 $C_p$ pulses before flip-flops 254 and 256 are reset. Thus, the last three pulses from gate 276 are passed by gate 290 when it is enabled by the true state of gate 288 if flip-flop 270 has not been set.

Gates 280, 282 and 284 sequentially sample flip-flops 262, 264 and 266, and are combined by gate 286. Thus, if flip-flop 262 is true during the first four of the last 12 pulses of the third counter, then gate 280 will be true during that time only. Similarly, during the second four pulses of the last 12 pulses, gate 282 will be true if flip-flop 264 is true; and similarly, gate 284 will be true during the last four pulses if flip-flop 266 is true. Gate 286 will be true any time that gates 280, 282 or 284 are true. The output of gate 292 will assume the same state as the output of gate 286 during the last 12 pulses, since gate 288 is true, assuming that flip-flop 270 has not been set.

Figure 7:
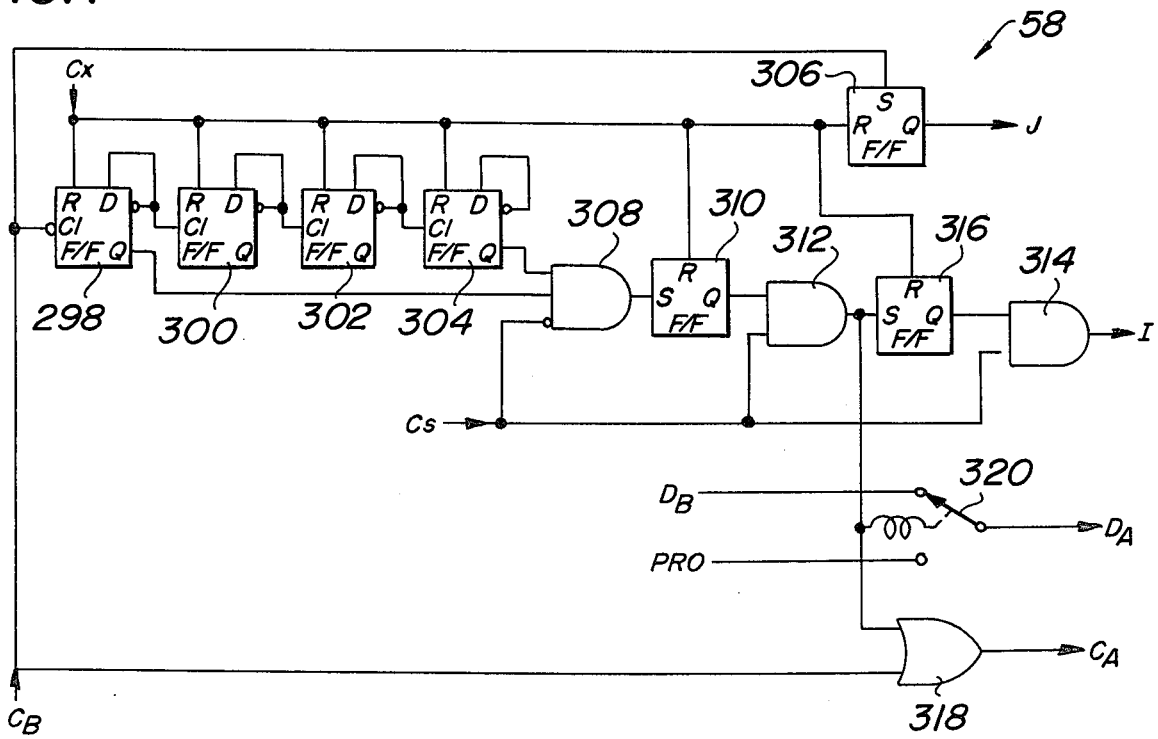
FIG. 7 is a schematic view of the input processor.

The input processor 58 is more specifically shown in FIG. 7 wherein the system comprises flip-flops 298, 300, 302 and 304 connected in series with each other, each having a connection with inpput $C_x$ as well as with a flip-flop 306. The flip-flop 306 is also adapted to receive the clock pulse $C_x$ and is in series with the flip-flop 298. The output from flip-flop 306 is indicated as line J, and is applied to switch 62 shown in FIG. 2.

The flip-flop 298 is in circuit with an AND gate 308 connected to a flip-flop 310 which is, in turn, connected to an AND gate 312. The AND gate 308 is in series with the flip-flop 304 and also receives an input from the continuously running clock pulse $C_x$. The AND gate 308 additionally receives the clock pulse $C_s$ which is also applied to an AND gate 314. The AND gate 314 is coupled to a flip-flop 316 which is also coupled to the AND gate 312. The output from AND gate 314 is indicated at I. Interposed in the line between the AND gate 312 and the flip-flop 316 is a line leading to an OR gate 318. Also coupled into this line is a switch 320.

The clock line $C_B$ from the detector 50 or 52 is applied both to the OR gate 318 and the flip-flop 298. The data line $D_B$ from the detector, as well as the program line PRO are applied to the switch 320. The OR gate 318 provides an output, indicated as line $C_A$, which is applied to the OR gate 64 shown in FIG. 2, while the switch 320 provides an output on line $D_A$ which is applied to the switch 62 shown in FIG. 2. The output on line $C_A$ is the clock pulse for clocking the auxiliary memory, while the output on line $D_A$ is the data level.

In operation, when one of the detectors (either 50 or 52) has detected three digits, the nine bits representing the three digits are produced on the $D_B$ line in synchronism with the clock pulses on the $C_B$ line. Since there are nine bits, there will be nine clock pulses. The nine $C_B$ clock pulses pass through OR gate 318, since AND gate 312 is false, so that the nine $C_B$ pulses appear on the $C_A$ line. In addition, since AND gate 312 is false, the data levels from the detector appearing on line $D_B$ pass through switch 320 to appear on line $D_A$. The first $C_B$ pulse sets flip-flop 306, so that line J becomes true, operating switch 62 so that the data levels on the $D_A$ line can pass through switch 62 to the data input of the auxiliary memory. Flip-flops 298, 300, 302 and 304 count the $C_B$ pulses. At the conclusion of the ninth $C_B$ pulse, the Q outputs of flip-flops 298 and 304 are both true, so that when line $C_s$ next becomes false, AND gate 308 becomes true, setting flip-flop 310. When line $C_s$ next becomes true, AND gate 312 becomes true, setting flip-flop 316 and switching switch 320 so that the $D_A$ line assumes the status of line PRO, and, in addition, making the $C_A$ line true. When $C_s$ again becomes false AND gate 312 becomes false, making OR gate 318 false and line $C_A$ false, so that a 10th pulse appears on line $C_A$ in synchronism with the next $C_s$ pulse which started after the ninth $C_B$ pulse concluded. In addition, when $C_s$ goes false, then flip-flop 316 is true, AND gate 314 becomes true, making line I true, which initiates the main cycle in the system shown in FIG. 4. The main cycle then starts with the next $C_s$ pulse, which produces a $C_r$ pulse, resetting all of the flip-flops in the network of FIG. 7, and restoring all of the output lines (J, I, $D_A$, and $C_A$) in FIG. 7 to a false state. In this manner, $C_r$ pulses can be passed through OR gate 64 to the clock input of the auxiliary memory and the output of the auxiliary memory can be recirculated through switch 62 to the data input of the auxiliary memory.

Figure 8:
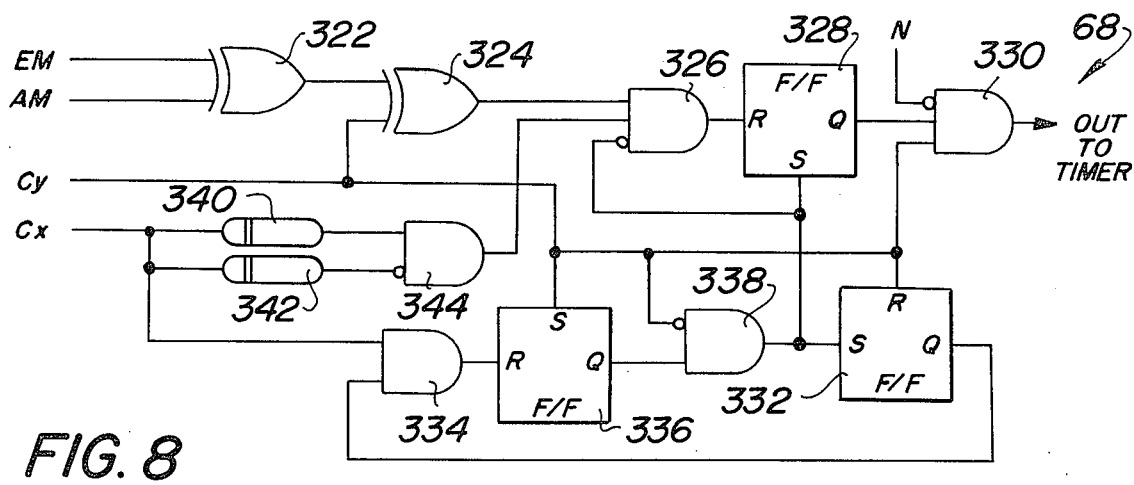
FIG. 8 is a schematic view of the comparator.

The comparator 68 is shown in detail in FIG. 8 and comprises an exclusive OR gate 322 coupled to an exclusive OR gate 324 which has an input $C_y$. The gate 324 is coupled to an AND gate 326 which is coupled to a flip-flop 328, the output of which is applied to an AND gate 330. The AND gate 326 is connected to the line between flip-flop 328 and a flip-flop 332, the flip-flop 332 applying its output to the AND gate 330 as well as to an AND gate 334. The AND gate 334 is coupled to a flip-flop 336 which receives an input $C_y$ and which applies its output to an AND gate 338. The AND gate 338 is connected to line $C_y$ and also to the line between AND gate 330 and flip-flop 332. The clock pulse $C_x$ is applied to delay units 340 and 342 of standard design, as well as to AND gate 334. The delay units 340 and 342 apply their outputs to an AND gate 344, the output of which is applied to AND gate 326.

The exclusive OR gate 322 receives the pulses on lines EM and AM from the respective main memory and auxiliary memory, while the output from AND gate 330, which has an input line N from the control unit 18, provides an output which is applied to the timer 76.

In operation, during the $C_y$ pulse, at the end of each word, flip-flop 328 is set. Exclusive OR gate 322 compares the outputs of the main memory and the auxiliary memory so that if there is no difference between the two memory outputs for the next nine $C_x$ clock pulses, flip-flop 328 will not be reset, whereby during the next $C_y$ pulse the output of AND gate 330 will be true and will start the timer, indicative of there having been a perfect match. If, instead, during any of the preceding nine bits, the main and auxiliary memory outputs have been different from each other, then exclusive OR gate 322 would have produced a true output, which would have reset flip-flop 328 so that during the next $C_y$ pulse AND gate 330 would have remained false. When the device is going through its memorization cycle, line N is true, which forces AND gate 330 to be false so that the timer cannot be restarted.

In greater detail, the outputs of the main memory and the auxiliary memory are compared by exclusive OR gate 322. If the memory outputs are the same, the output of gate 322 is false. If the outputs of the memories are different, the output of gate 322 is true. During the first nine bits of the word, $C_y$ is false, and therefore, the output of exclusive OR gate 324 is the same as the output of exclusive OR gate 322. During the first nine bits, AND gate 338 is false, so that if AND gate 344 is true, then AND gate 326 will be the same as the outputs of exclusive OR gates 322 and 324. In this maner, if the outputs of the main and auxiliary memories are different, then during the time that AND gate 344 is true, flip-flop 328 will be reset.

Since the outputs of the main and auxiliary memories may not change state at exactly the same time, there could be transient states, or gliches, at the output of exclusive OR gate 322 at the time of transition; therefore, delay units 340 and 342 and AND gate 344 produce a pulse at the output of AND gate 344 during the middle one-third of each $C_x$ pulse so that gate 326 can only sample the outputs of the exclusive OR gates during times when no transitions should be taking place in the memory outputs. At the time of the 10th $C_x$ pulse, $C_y$ also goes true, so that then the output of exclusive OR gate 324 will be the inverse of the output of exclusive OR gate 322. Since the tenth bit of all numbers preprogrammed into the main and extension memories is a one and the 10th bit of all numbers stored in the auxiliary memory for purposes of comparison is a zero, if it is a proper match, the output of exclusive OR gate 324 will be false during the $C_y$ pulse. Thus if the same number had come in previously and had been memorized, it will not cause a match, since it ends in zero.

$C_y$ also resets flip-flop 332, making AND gate 334 false, so that $C_y$ can set flip-flop 336. However, AND gate 338 remains false because $C_y$ is true. When $C_x$ and $C_y$ pulses end, making those lines false, since flip-flop 336 is set, gate 338 becomes true, setting flip-flop 328 (if necessary); inhibiting AND gate 326, and setting flip-flop 332. Since flip-flop 332 is set, the next $C_x$ pulse causes AND gate 334 to become true, resetting flip-flop 336, making AND gate 338 false, thus restoring the original condition of flip-flops 336 and 332, and AND gates 334 and 338, enabling AND gate 326 to again be controlled by exclusive OR gate 324 and AND gate 344.

If delay units 340 and 342 and AND gate 344 were left out, the circuit should still operate, but not as reliably. Conversely, if the delay unit and gate 344 are included, it is not necessary that the output of gate 338 be connected to the inverting input of AND gate 326.

Figure 9:
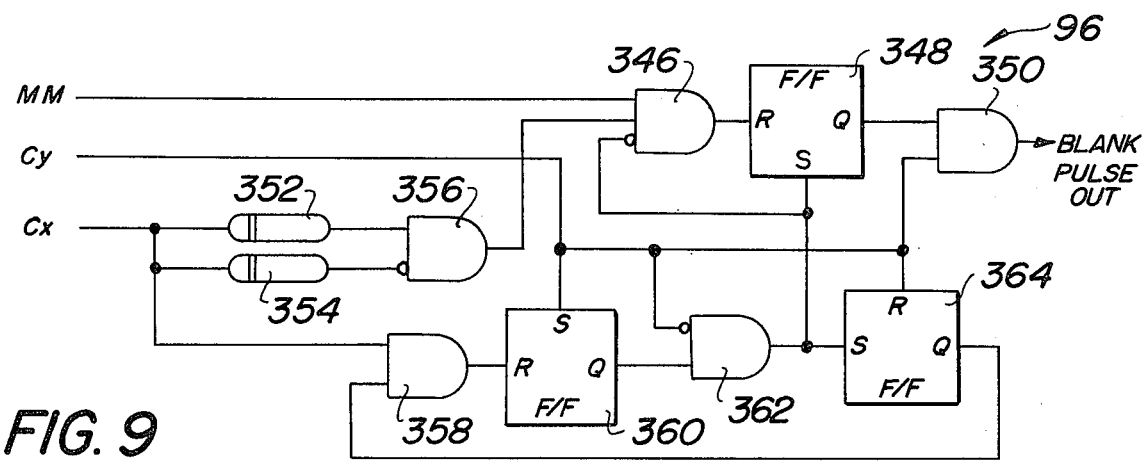
FIG. 9 is a schematic view of the "blank" detector.
Figure 10:
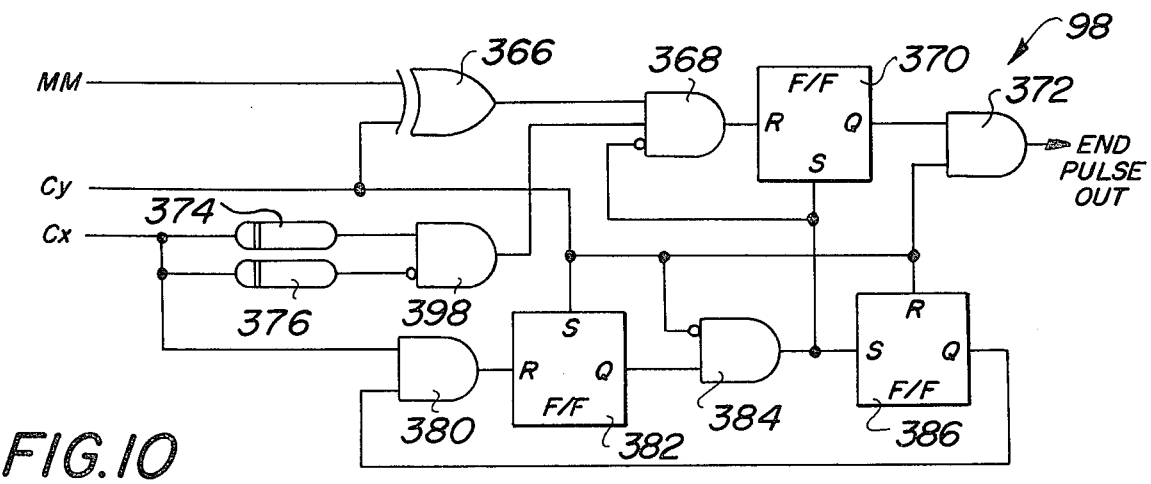
FIG. 10 is a schematic view of the "end" detector.

The blank detector 96, shown in FIG. 9 and the end detector 98, shown in FIG. 10, are almost identical to the comparator 68. Referring to FIG. 9, the blank detector 96 comprises an AND gate 346, a flip-flop 348, an AND gate 350, delay units 352 and 354, an AND gate 356, an AND gate 358, a flip-flop 360, an AND gate 362 and a flip-flop 364, all being the same and connected in the same manner as the corresponding parts in the comparator of FIG. 8. The only differences are that it does not have any N inhibit line and the inputs are applied from the output of the main portion 93 of the main memory, as indicated at line MM, which is, of course, also the input to the extension portion 94. The two exclusive OR gates used in the compartor network are, therefore, omitted.

Since a blank, by definition, consists of 10 zeros, the output of the main portion 93 of the main memory is connected directly to AND gate 346 without any intervening exclusive OR gates. Thus, any main memory true state will reset flip-flop 348 so that AND gate 350 does not produce a pulse.

The network of the end detector, shown in FIG. 10, is identical to that of the blank detector except that an exclusive OR gate 366 is inserted ahead of AND gate 368. The remaining components are numbered 368, 370, 372, 374, 376, 378, 380, 382, 384 and 386, and serve the same functions as the corresponding components in FIG. 9. In this system, the unique word chosen to represent end is nine zeros followed by a 1, so that the main portion 93 of the main memory is connected through the exclusive OR gate 366 to AND gate 368, so that if there is no $C_y$ pulse, any main memory true state will reset flip-flop 370. However, during the 10th, or $C_y$, bit, the main portion 93 of the main memory output must be true; therefore exclusive OR gate 366 reverses the situation on application of $C_y$ so that a false main portion bit will reset flip-flop 370, preventing AND gate 372 from producing a pulse representing the end.

Figure 11:
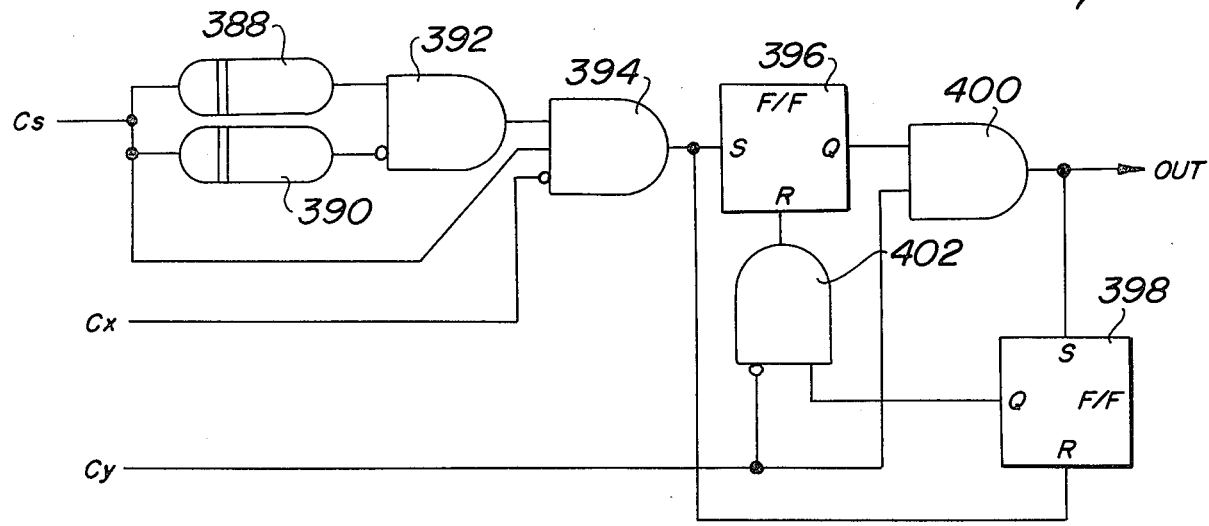
FIG. 11 is a schematic view of the eraser.

The eraser network is shown in FIG. 11 and comprises delay units 388 and 390 in circuit with an AND gate 392 which is coupled to an AND gate 394. The delay units 388 and 390 as well as the AND gate 392 receive $C_s$ pulses and AND gate 394 also receives $C_x$ pulses. The AND gate 394 is coupled to a flip-flop 396 as well as to a flip-flop 398. The flip-flop 396 is also coupled both to an AND gate 400 and an AND gate 402, the latter being coupled to the flip-flop 398 and receiving $C_y$ pulses, these latter pulses also being applied to the AND gate 400.

A convenient unique word to use to represent END is nine zeros followed by a one in the 10th bit. Since a blank is 10 zeros, that means that the blank and the unique word together only represent the deletion of one combination out of all the combinations that could be used, and the dial and touch-tone detectors can easily be set up so that they do not decode a number consisting of only zeros—or in terms of actual numbers that would be dialed on a telephone, a number consisting of only nines. Thus the eraser is simply a circuit which produces nine zeros followed by a true bit during a $C_y$ pulse, followed by all zeros for whatever size the main memory may be. The particular network operates as follows:

When flip-flop 168, shown in FIG. 4, is in a reset condition, AND gate 170 is false, therefore line $C_x$ is false until such time as the main cycle is initiated, such as, in this case, by pressing the Reset button. Delay units 388 and 390 and AND gate 392 operate in exactly the same fashion as the delay units and AND gate 344 in the comparator, so that only the middle third of each $C_s$ pulse appears at the output of AND gate 392. If line $C_x$ is false because flip-flop 168 is reset, then AND gate 392, becoming true, causes AND gate 394 to become true, setting flip-flop 396. However, since $C_y$ is false if $C_x$ is false, AND gate 400 is false, producing a zero output.

When flip-flop 168 is set, as, for example, when the reset button is depressed with the selector switch in the Program position, then AND gate 170 is enabled by flip-flop 168 so that $C_x$ pulses and $C_y$ pulses are produced. Since flip-flop 396 is already set, but $C_y$ is false, the eraser produces a zero output for the first nine $C_x$ pulses, thereby feeding nine zeros into the main memory. During the 10th $C_x$ pulse, $C_y$ becomes true, making AND gate 400 true, since flip-flop 396 is true, so that the eraser produces a true output, feeding a 1 into the main memory. At the same time, the output of AND gate 400 sets flip-flop 398. However, $C_y$ is true; so the output of AND gate 402 is false, so that flip-flop 396 is not reset. When $C_y$ goes false, AND gate 402 becomes true, resetting flip-flop 396, holding the output of AND gate 400 false for any subsequent $C_y$ pulses, so that all subsequent input to the main memory consists of zeros. Since $C_r$ is always true when $C_s$ is true, if flip-flop 168 is set, the output of AND gate 394 remains false so that flip-flop 396 cannot be set until such time as flip-flop 168 (FIG. 4) is reset, making AND gate 170 (FIG. 4) always false, thus making $C_x$ always false permitting the middle third of $C_s$ to make AND gate 394 true, setting flip-flop 396 for the next time that the main cycle is repeated. Flip-flop 168 (FIG. 4), of course, is reset by the "end" detector, having detected the unique word, producing an "end" pulse. The eraser always operates during each main cycle; however, the eraser has no effect upon the main memory unless the lines to 72, 74 and 88 (FIG. 4) are all true.

All the other elements of the system, not specifically described, are standard equipment that is commercially available. In this respect, the tens counter may include an RCA integrated circuit type CD4026A with one pin as input $C_x$ and another pin connected to an inverter as an output $C_y$. The auxilliary memory and extension portion of the main memory may include RCA integrated circuit type CD4006A with the memory input on one pin, the memory output on another pin, the clock input on a third pin and two other pins jumped together. The main portion of the main memory may include several RCA CD4006A circuits connected in cascade.

Figure 12:
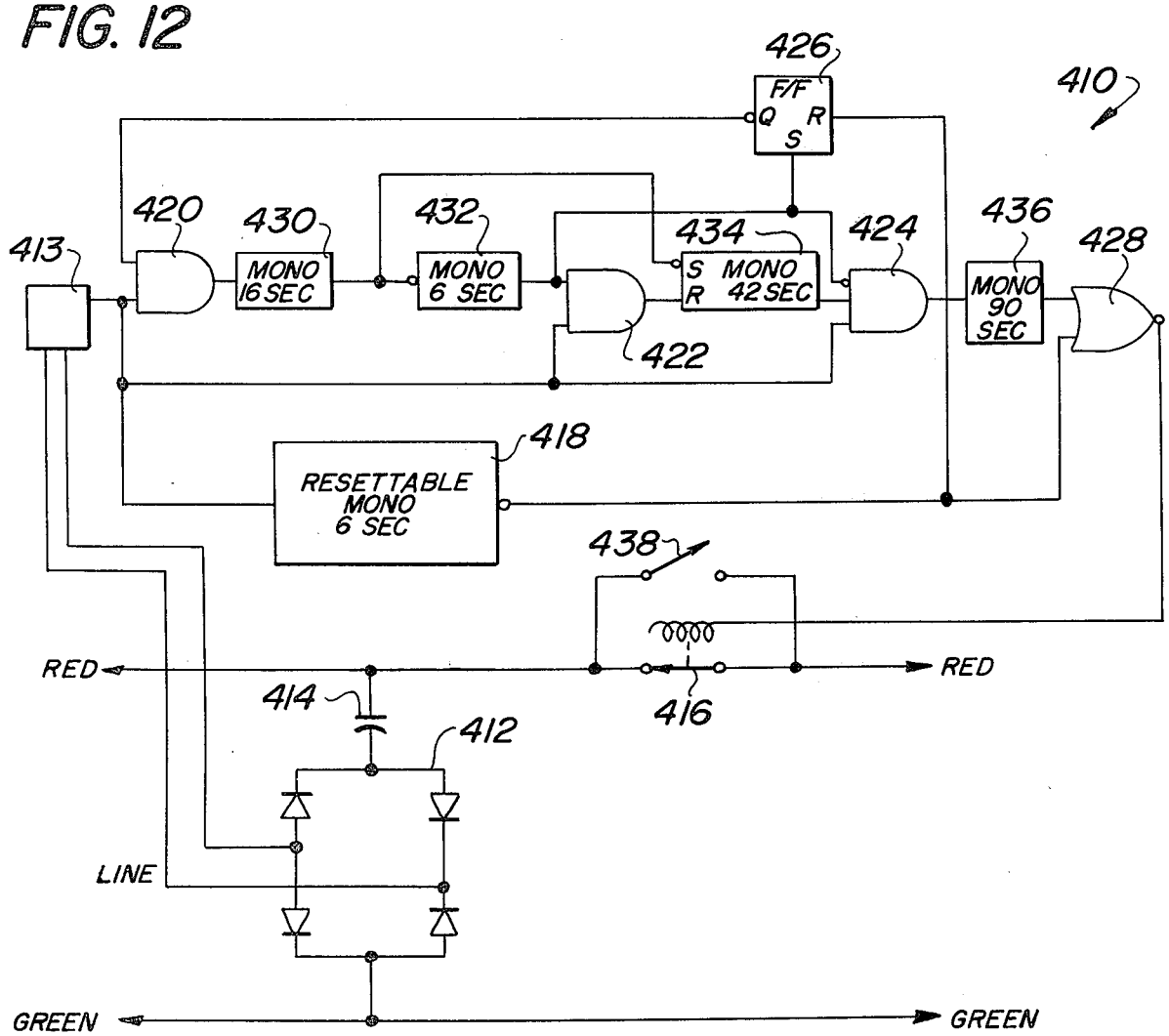
FIG. 12 is a schematic view of an optional ring signal cut off network that may be used in conjunction with the main system.

The above-described system charges the caller for the call even though the phone is not answered. If it is desired to prevent such charge, a unit is inserted before the interface 40, this unit being generally designated 410 and being illustrated in FIG. 12.

The unit 410 is connected to the red and green telephone lines and comprises a bridge rectifier 412 coupled to the red and green lines by a capacitor 414. A relay 416 is also coupled into the red line (or the green line, if desired). The bridge rectifier 412 is coupled through a relay 413 both to a resettable monostable 418 and to AND gates 420, 422, and 424, each of which is coupled to a flip-flop 426. The resettable monostable 418 is also coupled to flip-flop 426 as well as to a NOR gate 428.

The AND gate 420 is in circuit with a monostable 430 which is coupled both to a monostable 432 and to a monostable 434. The monostable 432 is in circuit with AND gate 422 which is in circuit with monostable 434, monostable 432 also being in circuit with AND gate 424 which is also coupled to monostable 434. The output of AND gate 424 is applied to monostable 436, the output of which is applied to OR gate 428 which is in circuit with relay 416.

Monostables 430, 432, and 436 each comprises a network consisting of the same flip-flops as shown at 218, 220, 222, 224 and 226, plus an AND gate as shown at 228 in FIG. 6, these elements operating in the same manner. Monostable 434 also utilizes components shown in FIG. 6 of the present application such as flip-flops 242, 244, 246, 248, 250, 252 and 254 taken together with OR gate 258 and AND gate 260, wherein the input labelled S on monostable 434 would be the S or set input of flip-flop 254 and the R input of monostable 434 would be the input from gate 274 to gate 258. Monostable 418 is similar to monostable 434 except that it includes flip-flop 156 and its input is the set input of flip-flop 256.

The above description of the monostables are provided as illustrative. However, such monostables are substantially standard equipment which need not be specifically illustrated for those skilled in the art and, by themselves, form no part of the present invention outside of the system as disclosed.

The monostables operate individually as follows: The monostable 430 produces a true output for a predetermined time (e.g., 16 seconds) following a transition of its input from false to true; otherwise the output is false. Monostable 432 produces a similar output, except that it is triggered by a true-to-false transition at its input. Monostable 436 operates similarly to monostable 430 but with a different duration. Monostable 434 operates similarly to monostable 432 except for a different duration, and its output is terminated whenever the R input is made true (e.g., if the output is positive when the R input becomes positive, then the output becomes false). The output of monostable 418 is true unless the input becomes true, in which case the output would become false and would remain false as long as the input is true, and for a predetermined interval (e.g., 6 seconds) after the input becomes false.

In operation, when a ringing signal appears between the red and green terminals of the line, since the ringing signal is AC, it is passed by capacitor 414 and rectified by the bridge rectifier 412 to produce DC, which operates the relay 413. Because of its inductance, the relay 413 remains continuously operated without chatter as long as the ringing signal is present. The contacts of relay 413 close, thus making the input of monostable 418 true and the output of monostable 418 false. Since the output of monostable 436 is also false, the output of gate 428 becomes true, opening normally-closed relay 416. The contacts of relay 416 are in series with the red line (or the green line) to the interface. Since the preceding sequence occurs quite rapidly, no ringing signal is passed to the interface circuit, so that the interface circuit is not aware that the line had a ringing signal on it.

Monostables 430 and 432 operate very much as a filter. More particularly, a typical ringing signal sent to a telephone has the same timing characteristics (e.g. 2 seconds on, 4 seconds off) as the timing of the ringing signal heard by the calling party. However, the produced ringing signal is not necessarily in synchronism with that heard by the calling party. Thus the calling party must hear at least two repetitions of the ringing signal to assure himself that at least one ringing signal has been passed to the called telephone. Conversely, if the calling party hears two repetitions of the ringing signal, there may have been as many as three repetitions of the ringing signal. The duration of monostable 430 is selected to represent a time interval between that required for three ringing signals (e.g. 14 seconds) and that required for four repetitions of the ringing signal (e.g. 18 seconds). The duration of monostable 432 may be selected as 6 seconds for the same reason as the duration of monostable 418 may be selected for 6 seconds, namely, the period of time between the beginnings of twp repetitions of a ringing signal. The duration of monostable 434 is selected on the basis of how much time is to be allowed the caller to call back without feeling rushed, but short enough that a second caller may not inadvertantly be caught on the tail of the first. In other words, the system should revert as promptly as possible to initial conditions.

The minimum time for monostable 434 may be 10 seconds, based upon the time from the conclusion of a ringing signal to the beginning of the second subsequent repetition of the ringing signal. In other words, at least sufficient time must be allowed for the skipping of one ringing signal, which can also be thought of as the duration of monostable 432 plus the time between two repetitions of ringing signals.

The duration of monostable 436 is set on the basis of the maximum amount of time required for all subsequent circuitry plus the time required for the caller to dial the correct code. The duration of monostable 436 determines how long the called line is tied up before a new call can be received. In other words, the line is in a busy condition because of being off-hook for the duration of monostable 436.

In operation, before any ringing signal appears, the output of monostable 418 is true; therefore, flip-flop 426 is reset, making its output true; consequently, when a ringing signal appears on the line and relay 413 operates, both inputs of AND gate 420 are true, making the output of AND gate 420 true and the input of monostable 430 true. Since the outputs of monostables 432 and 434 are false, the outputs of AND gates 422 and 424 continue false. At the conclusion of the duration of monostable 430 (e.g. 16 seconds) from the beginning of the first ringing signal, the output of monostable 430 becomes false, causing monostable 432 to trigger and its output to become true. Additionally, when the output of monostable 430 becomes true, this triggers monostable 434, making its output true; however, the output of monostable 432 is true, so that the output of AND gate 424 remains false. Additionally, when the output of monostable 432 becomes true, this sets flip-flop 426, making its output false, so that monostable 430 cannot be retriggered by any additional repetitions of the ringing signal. If a fourth repetition of the ringing signal should occur, since the output of monostable 432 is true, AND gate 422 becomes true, resetting monostable 434, which will remain reset until such time as the output of monostable 430 should again become true. However, monostable 430 cannot be retriggered because flip-flop 426 has been set. Eventually, when the repetitions of the ringing signal cease, a predetermined time, such as, for example, 6 seconds later, monostable 418's output will become true, resetting flip-flop 426, so that monostable 430 is ready to go to work again, since initial conditions have been restored.

If instead a fourth repetition of the ringing signal does not occur, monostable 434 continues and monostable 432 returns to it stable condition with its output false, so that, if after skipping at least one repetition of the ringing signal, a new ringing signal occurs (operating relay 413), since the output of monostable 432 is now false, the output of AND gate 422 remains false; however, since the output of monostable 434 is true, the output of monostable 432 is false, and a ringing signal is present, AND gate 424 becomes true, triggering monostable 436, so that its output becomes true, forcing the output of NOR gate 428 to be false, causing relay 416 to drop out for the duration of monostable 436 (e.g., 90 seconds), so that for that time interval the interface circuitry is connected to the line as if the ring delay circuit did not exist. Since the dropping out of relay 416 requires only a small initial portion of the ring signal, the same ring signal causes relay 100 to operate, which produces an off-hook condition, terminating the ring signals and permitting the desired codes to be transmitted.

If alternatively, during the time that monostable 434's output is true no ring signal is received, the output of AND gate 424 will not become true, and monostable 434 will, at the end of its duration, return to its stable state, returning the circuit to its initial conditions so that it is ready to go to work again on an entirely new set of ring signals. The entire operation of this ring delay circuit can be defeated by the closure of switch 438.

The invention claimed is:

1. A system for screening incoming signals to separate acceptable signals from unacceptable signals and to apply the acceptable signals to a function-generating means comprising:
  a signal transmitter, a signal receiver including a signalling means and a function-generating means in alternative normally-closed circuit with said transmitter, and a sensing means for opening the circuit to said signalling means and closing the circuit to said function-generating means upon passage to said sensing means of an initial signal from said transmitter;
  a detector and decoding means, operative when the circuit between said signal transmitter and said function-generating means is closed, for separating selected transmitted signals from unselected transmitted signals by filtering out the unselected signals, and serially converting the selected signals into data bits representing digits;
  a memory means comprising a main memory and an auxiliary memory, each adapted to serially pass digit-forming data bits therethrough, said auxiliary memory receiving data bits from said detector and decoding means;
  a programming means for directly and selectively programming said main memory with selected digits;
  a comparator means for comparing the output of said auxiliary memory with the output of said main memory to obtain an acceptable signal when said outputs match;
  and means for transmitting said acceptable signal to said function-generating means.

2. The system of claim 1 wherein a return signal means is coupled to said function-generating means to send a return signal to said transmitter indicating actuation of the system.

3. The system of claim 1 wherein a display means is coupled to said memory means to display digits that have been stored in said memory means.

4. The system of claim 1 wherein an eraser means is coupled to said memory means to erase stored digits from said memory means.

5. The system of claim 1 wherein said sensing means is coupled to a timer for deactivating said sensing means and restoring the system to the condition prevailing prior to the transmission of the initial signal from said transmitter after a predetermined time interval.

6. The system of claim 1 wherein said system is coupled to a telephone network, said transmitter being a calling station and said receiver being a receiving station.

7. The system of claim 6 wherein said receiving station is selectively coupled to said programming means to actuate said programming means by transmission thereto of selected pulses.

8. The system of claim 6 wherein said calling station is selectively coupled to said programming means to actuate said programming means by transmission thereto of selected pulses.

9. The system of claim 6 wherein said detector and decoding means comprise a dial decoder and a tone decoder, said decoders being alternatively actuatable by corresponding dialed and tone signals.

10. The system of claim 1 wherein a cut-off means is coupled between said transmitter and said sensing means, said cut-off means comprising a normally-closed switch means which is coupled to an actuating means hich is coupled to said transmitter, said actuating means being energized by signals passed thereto by said transmitter, said actuating means acting to open said normally-closed switch means upon being energized.

11. The system of claim 10 wherein reactivating means are coupled between said actuating means and said normally-closed switch means to close said switch means upon the termination of signals from said transmitter.

* * * * *